United States Patent
Lin

(10) Patent No.: US 9,237,026 B2
(45) Date of Patent: Jan. 12, 2016

(54) REMOTE NOTIFICATION METHOD

(71) Applicants: Inventec (Pudong) Technology Corporation, Shanghai (CN); INVENTEC CORPORATION, Taipei (TW)

(72) Inventor: Pai-Chen Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 171 days.

(21) Appl. No.: 14/219,830

(22) Filed: Mar. 19, 2014

(65) Prior Publication Data
US 2014/0351358 A1 Nov. 27, 2014

(30) Foreign Application Priority Data

May 23, 2013 (CN) .......................... 2013 1 0195877

(51) Int. Cl.
G06F 15/16 (2006.01)
H04L 12/18 (2006.01)

(52) U.S. Cl.
CPC ............ H04L 12/1895 (2013.01); *H04L 12/189* (2013.01)

(58) Field of Classification Search
CPC ......................... H04L 12/1895; H04L 12/189
See application file for complete search history.

(56) References Cited

U.S. PATENT DOCUMENTS

| | | | | |
|---|---|---|---|---|
| 7,596,369 B2* | 9/2009 | Alperin | ............... | H04L 65/1069 370/328 |
| 7,653,193 B2* | 1/2010 | Pfleging | .................. | H04M 3/56 370/260 |
| 8,170,189 B2* | 5/2012 | Alperin | ............. | H04M 3/42263 370/352 |
| 8,315,361 B1* | 11/2012 | Becker | ................ | H04M 1/7255 348/582 |
| 8,478,338 B2* | 7/2013 | Sudhakar | ................ | H04M 1/67 455/410 |
| 8,880,047 B2* | 11/2014 | Konicek | ............ | H04M 1/72513 455/414.1 |
| 8,938,810 B2* | 1/2015 | Richardson | ............ | H04W 12/12 455/411 |
| 9,078,078 B1* | 7/2015 | Fine | ......................... | H04W 4/00 |
| 2007/0239833 A1* | 10/2007 | Alperin | .................... | H04L 12/58 709/206 |
| 2007/0239880 A1* | 10/2007 | Alperin | ............... | H04L 65/1069 709/230 |
| 2007/0239895 A1* | 10/2007 | Alperin | ............... | H04L 12/5835 709/246 |
| 2009/0143048 A1* | 6/2009 | Ayanamcottil | .......... | G06F 21/88 455/410 |
| 2012/0202462 A1* | 8/2012 | Sudhakar | ................ | H04M 1/67 455/411 |

* cited by examiner

*Primary Examiner* — Moustafa M Meky
(74) *Attorney, Agent, or Firm* — Locke Lord LLP; Tim Tingkang Xia. Esq.

(57) ABSTRACT

A remote notification method is applicable to a remote notification method, where a server, through the Internet, receives user information sent by an application program executed in a first communication device, the server according to the user information sets a remote notification mode. When the server receives a startup command sent by a terminal device, the server, through the Internet, receives a message sent by the application program and sends out the message according to the remote notification mode. Therefore, a user can change the notification mode according to real usage requirements and can obtain the message received by the first communication device when not being able to directly operate the first communication device.

10 Claims, 4 Drawing Sheets

REMOTE NOTIFICATION METHOD

CROSS-REFERENCE TO RELATED APPLICATIONS

This non-provisional application claims priority under 35 U.S.C. §119(a) on Patent Application No(s). 201310195877.6 filed in China on May 23, 2013, the entire contents of which are hereby incorporated by reference.

BACKGROUND OF THE INVENTION

1. Technical Field of the Invention

The disclosure relates to a notification method, more particularly to a remote notification method.

2. Description of the Related Art

Mobile communication devices, especially mobile phones, have been widely used in daily life for communication. If the mobile phone is left at home, some important incoming calls or short messages will be missed, resulting in the user's inconvenience.

The remote notification system in the current market of mobile phones only provides a service in which incoming calls and short messages will be forwarded from one mobile phone to another through the network setting when the mobile phone is lost. For example, a console designed by a certain manufacturer of mobile phones supports such a setting function. However, such a forwarding service requires two mobile phones having different phone numbers and does not provide an email notification service, so that a user can not receive the incoming call information and short messages through a cloud computing.

Even though some telecommunications companies would notify users via the short message service (SMS) while users missed incoming calls, users could not know the notices from the telecommunications companies if their mobile phones were not with them.

SUMMARY OF THE INVENTION

A remote notification method according to an embodiment of the disclosure includes the following steps. User information sent by an application program executed in a first communication device is received through the Internet. According to the user information, a remote notification mode is set. A startup command sent by a terminal device is received. A message sent by the application program is received through the Internet. According to the remote notification mode, the message is sent out.

In an embodiment of the disclosure, the message is a first call request or a short message received by the first communication device.

In an embodiment of the disclosure, the message is sent to a second communication device through an email or a second call request under the remote notification mode.

In an embodiment of the disclosure, when the message is the first call request, a second call request is sent to the second communication device under the remote notification mode.

In an embodiment of the disclosure, the remote notification method further includes the following steps. When the second call request is answered, an answered command is sent to the application program through the Internet, for enabling the first communication device to respond a first audio signal to the first call request through the Internet. The first audio signal is sent to the second communication device. A second audio signal sent by the second communication device is received. The second audio signal is sent to the application program through the Internet.

In an embodiment of the disclosure, when the message is the short message, a content of the short message is sent via the email under the remote notification mode.

In an embodiment of the disclosure, when the message is the first call request, a caller number corresponding to the first call request is sent out via the email under the remote notification mode.

In an embodiment of the disclosure, the remote notification method further includes the following steps. Whether to successfully access the application program through the Internet is determined. If the application program is not accessed through the Internet successfully, a connection command is sent to the application program through a telecommunication network, for controlling the first communication device via the application program to communicate with the Internet.

In an embodiment of the disclosure, the remote notification method further includes the following steps. An operation command sent by the terminal device is received. The operation command is sent to the application program through the Internet, for controlling the first communication device via the application program to execute the operation command.

In an embodiment of the disclosure, the user information is an email address, a phone number of the first communication device, an identification code of the application program or an international mobile equipment identity number (IMEI) of the first communication device.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
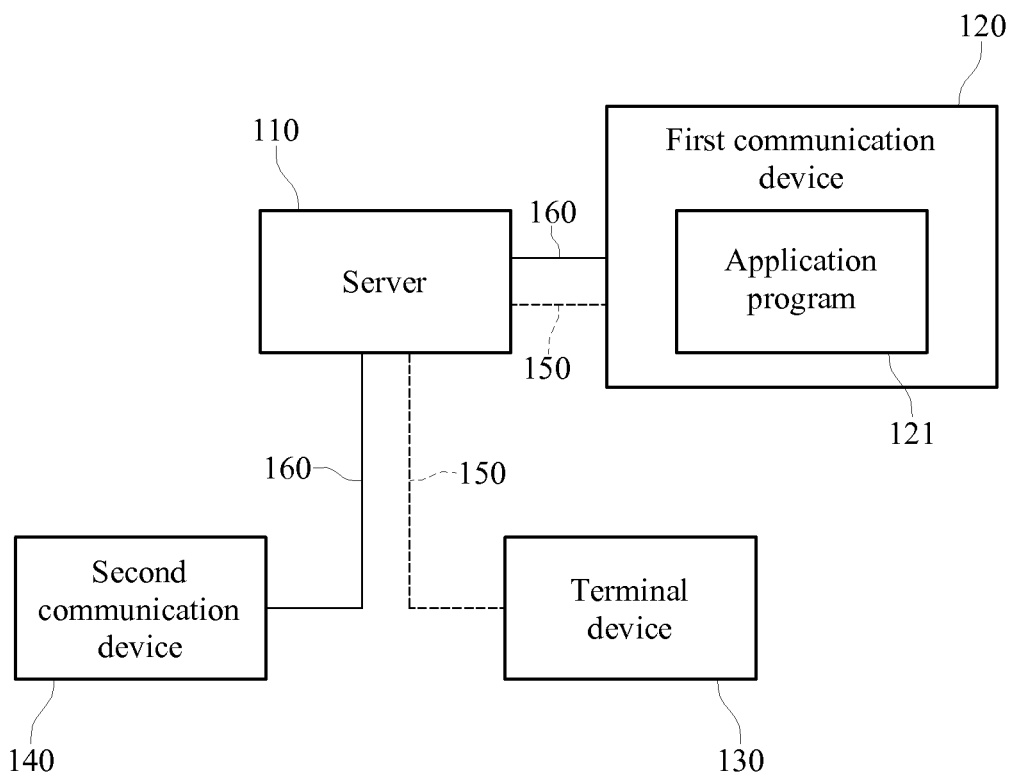
FIG. 1 is a schematic diagram of a remote notification system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a remote notification system according to an embodiment of the disclosure. A remote notification system 10 includes a server 110, a first communication device 120, a terminal device 130 and a second communication device 140. The server 110 communicates with the first communication device 120 through an Internet 150 or a telecommunication network 160. The terminal device 130 communicates with the server 110 through the Internet 150. The second communication device 140 communicates with the server 110 through the telecommunication network 160. The first communication device 120 executes an application program 121.

For instance, the first communication device 120 and the second communication device 140 are mobile phones, smart phones, home phones or other voice communication devices that application programs are installed within. For instance, the Internet 150 is the Ethernet, the IEEE 802.11 protocol, communication protocols, e.g. the worldwide interoperability for the microwave access (WiMAX) and the digital subscriber line (DSL), which allow a great deal of data transmission and exchange. For instance, the telecommunication network 160 is the third-generation of mobile telecommunications technology (3G), the fourth-generation of mobile telecommunications technology (4G), the code division multiple access (CDMA), the personal handy-phone system (PHS) or other voice communication systems. For instance, the terminal device 130 is a tablet personal computer (tablet PC), a table computer, a notebook or other computer devices capable of communicating with the Internet 150. The disclosure will not be limited to the aforementioned examples.

The server 110 receives user information sent by the application program 121 through the Internet 150, and according to the user information sets a remote notification mode. Under the remote notification mode, the server 110 sends a call request to a desired second communication device 140 through the telecommunication network 160, and sends an email to the ordained second communication device 140 through the Internet 150 or sends a short message to the desired second communication device 140 through the telecommunication network 160, but the disclosure will not be limited thereto.

When the server 110 receives a startup command sent by the terminal device 130, the server 110 enters into a standby state. Herein, when the first communication device 120 receives a call request or a short message, the first communication device 120 utilizes the application program 121 to send the call request or the short message to the server 110 via a message through the Internet 150 according to the remote notification mode.

Figure 2:
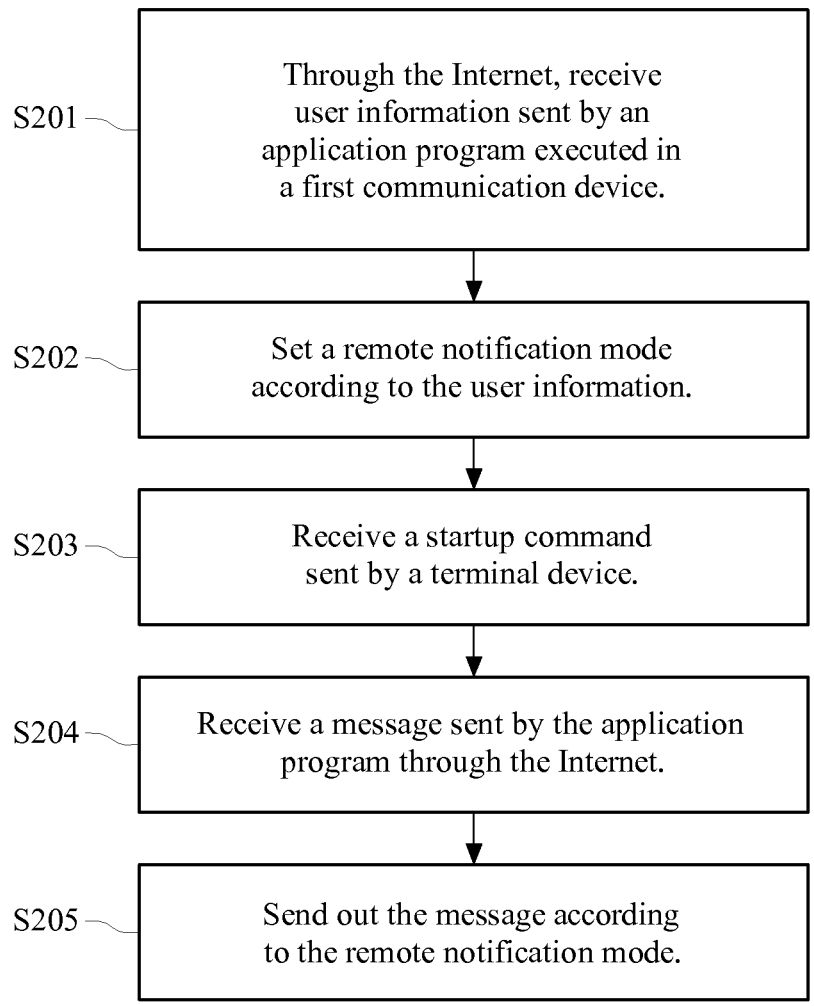
FIG. 2 is a flowchart of a remote notification method according to an embodiment of the disclosure.

The aforementioned operation of the remote notification system 10 is summarized as follows. FIG. 2 is a flowchart of a remote notification method according to an embodiment of the disclosure. The remote notification method is performed by the server 110 and includes the following steps. Firstly, user information sent by an application program executed in a first communication device is received through an Internet (step S201), and a remote notification mode is set according to the user information (step S202). Subsequently, a startup command sent by a terminal device is received (step S203), and a message sent by the application program is received through the Internet (step S204). Finally, the message is sent out according to the remote notification mode (step S205).

As continued from the aforementioned operation, assume that the first communication device 120 receives a short message. The application program 121 sends the content of the short message to the server 110 through the Internet 150. The server 110 can send the content of the short message to a desired email address through the Internet 150, and then the content of the short message will be presented on the terminal device 130 to be read. Moreover, the server 110 can directly forward the short message to the designated second communication device 140 through the telecommunication network 160, or can convert the content of the short message into a voice message and then send the voice message to the designated second communication device 140 through the telecommunication network 160.

Otherwise, assume that the first communication device 120 receives a first call request. The application program 121 sends a caller number corresponding to the first call request, to the server 110 through the Internet 150. When the server 110 receives the caller number, the server 110 sends a second call request to the designated second communication device 140 through the telecommunication network 160. If the designated second communication device 140 answers the second call request, the server 110 sends an answered command to the application program 121 through the Internet 150, for enabling the first communication device 120 to answer the first call request. The application program 121 further responds a first audio signal to the first call request, and the first audio signal is sent back to the server 110 through the Internet 150.

After receiving the first audio signal, the server 110 sends the first audio signal to the designated second communication device 140 through the telecommunication network 160, and meanwhile the server 110 receives a second audio signal sent by the designated second communication device 140 through the telecommunication network 160, and sends the second audio signal to the application program 121 through the Internet 150.

If the designated second communication device 140 does not answer the second call request, the server 110 can either send an email including the caller number of the first call request, to the designated second communication device 140 through the Internet 150, or send a short message including the caller number of the first call request, to the designated second communication device 140 through the telecommunication network 160.

Figure 3A:
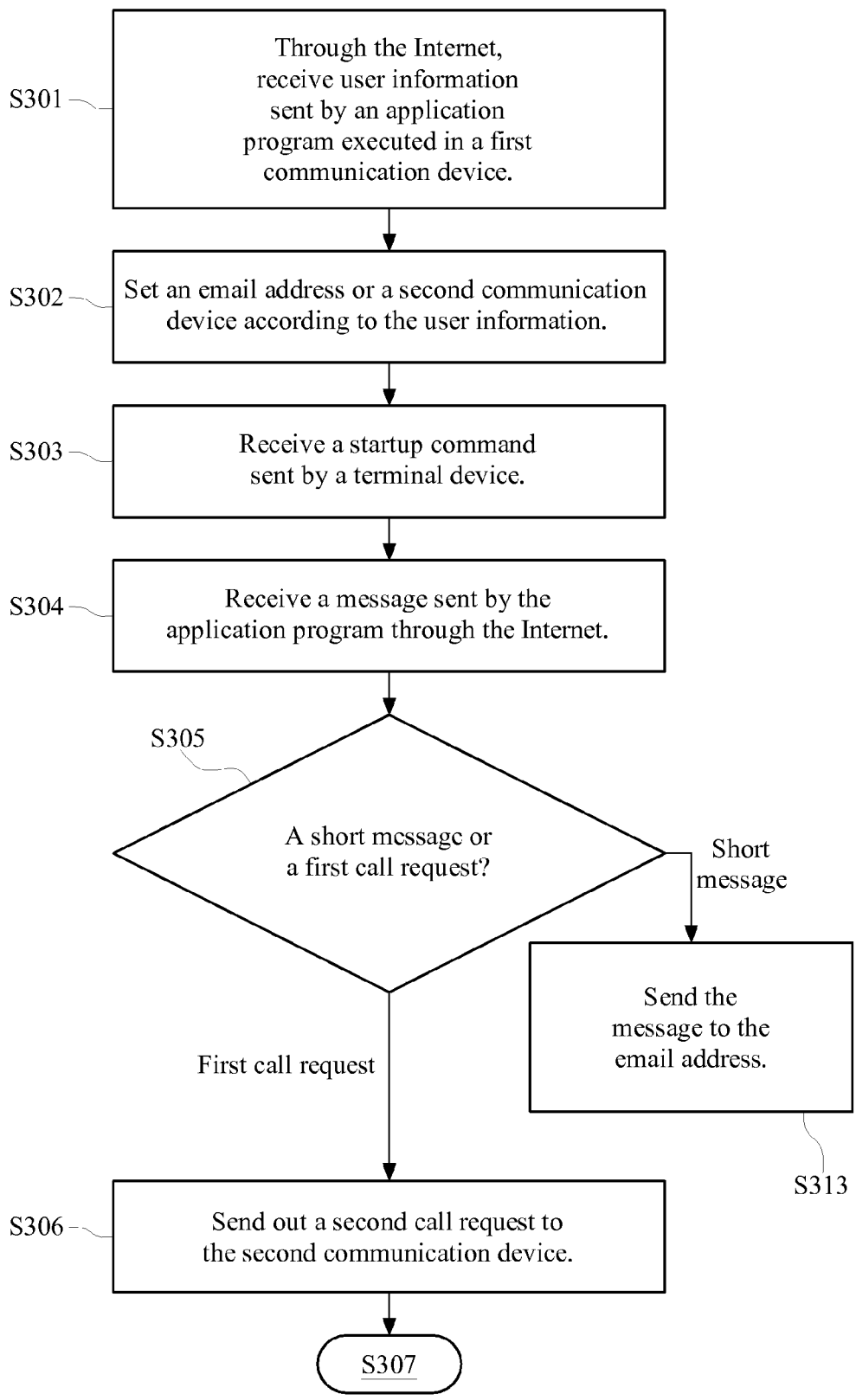
FIG. 3A and FIG. 3B show a flowchart of a remote notification method according to an embodiment of the disclosure.
Figure 3B:
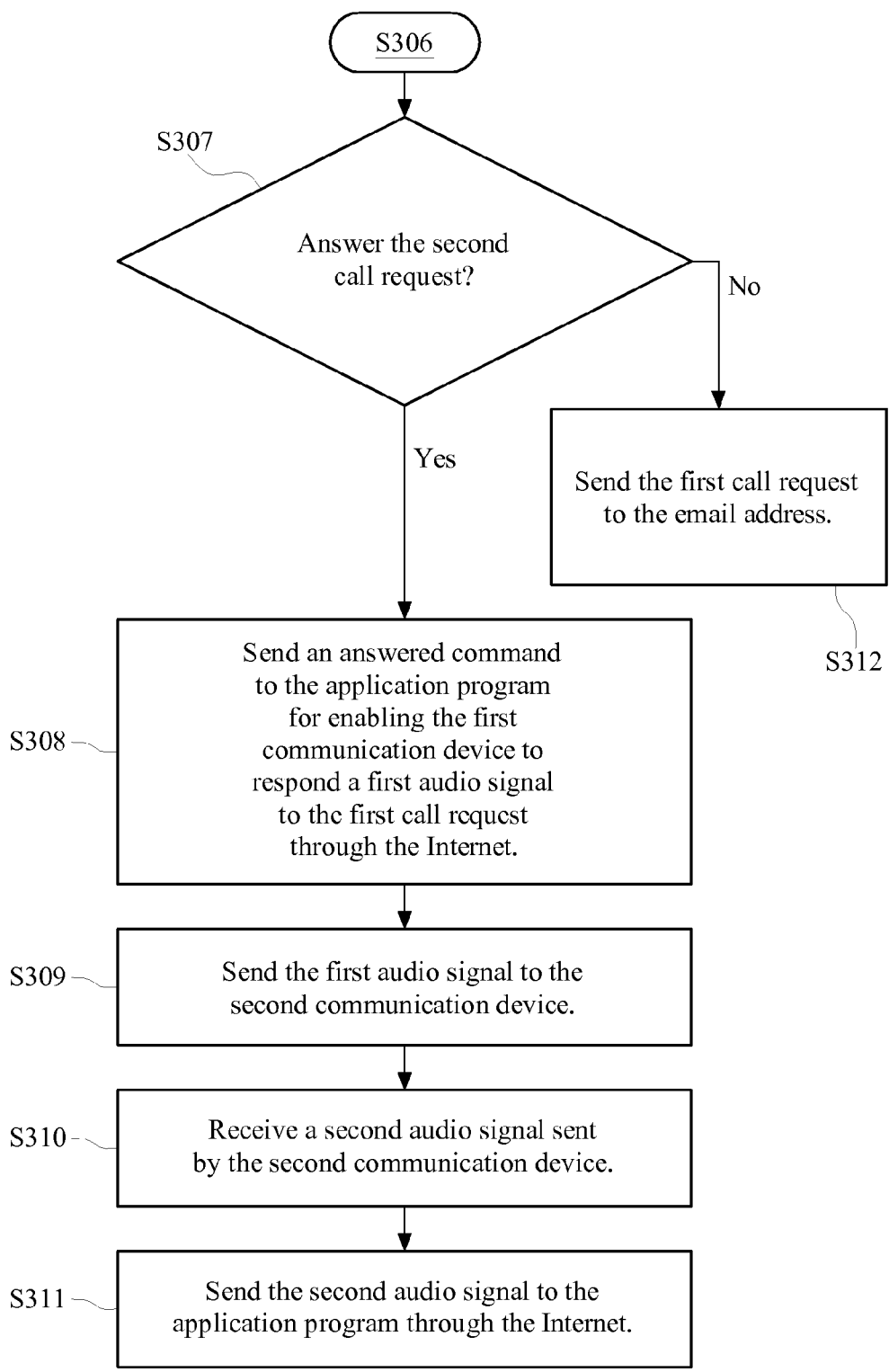

The aforementioned operation of the remote notification system 10 is summarized as follows. FIG. 3A and FIG. 3B show a flowchart of a remote notification method according to an embodiment of the disclosure. The server 110 performs the remote notification method. Firstly, user information sent by an application program executed in a first communication device is received through the Internet (step S301), and an email address or a second communication device is set according to the user information (step S302). After a startup command sent by a terminal device is received (step S303), a message sent by the application program is received through the Internet (step S304). If the message is a first call request in step S305, a second call request is sent to the second communication device (step S306), and if the message is a short message in step S305, the short message is sent to the email address (step S313). Subsequently, whether the second call request is answered is answered or not is determined (step S307). If the second call request is answered in step S307, an answered command is sent to the application program for enabling the first communication device to respond a first audio signal to the first call request through the Internet (step S308); and otherwise, the first call request is sent to the email address (step S312). After the first audio signal is sent to the second communication device (step S309), a second audio signal sent by the second communication device is received (step S310). Then, the second audio signal is sent to the application program through the Internet (step S311).

In this way, even if a user can not use the first communication device 120 because of some unexpected reasons, the user can use the terminal device 130 to send a command to the server 110 for enabling the server 110 to communicate with the first communication device 120 and set one or more than one notification rule. When the first communication device 120 receives a short message, the user can obtain an email having the content of the short message presented on the terminal device 130 or other terminal devices, and uses the first communication device 120 to answer the short message via the server 110. Otherwise, when the first communication device 120 receives a call request, the user can obtain the call request through an email, or can receive and answer the call request via the designated second communication device 140.

Furthermore, when the server 110 receives the startup command sent by the terminal device 130, the server 110 sends a request to the application program 121 through the Internet 150, for determining whether the server 110 can successfully access the application program 121 through the Internet 150 or not. If the application program 121 is not successfully accessed through the Internet 150, the server 110 sends a connection command to the first communication device 120 through the telecommunication network 160. For instance, the connection command is sent through a short message, or through a call request specifying a specific phone number and corresponding to the first communication device 120. When the first communication device 120 receives the connection command, a communication between the first communication device 120 and the Internet 150 will be made according to the control of the application program 121.

When the server 110 receives an operation command sent by the terminal device 130, the server 110 sends the operation command to the application program 121 through the Internet 150. The application program 121 controls the first communication device 120 to execute the operation command. For example, the operation command is an alarm clock setting, a resume by alarm setting, an auto shutdown setting, a command for sending a short message or a command for sending a call request. Accordingly, the terminal device 130, the server 110 and the Internet 150 can be employed to control the first communication device 120.

In the disclosure, the aforementioned user information can be, for example, an email address, a phone number of the first communication device 120, an identification code of the application program 121 or an international mobile equipment identity number (IMEI) of the first communication device 120.

In the disclosure, a terminal device 130 or the first communication device 120 can be employed to communicate with the server 110 for changing email addresses or selecting another designated second communication device 140.

Through the remote notification method of the disclosure, a user can remotely interact with a first communication device. When the first communication device receives a message, the user can remotely receive and answer the message. Moreover, the user can adjust the setting of remote information reception according to real application requirements.

What is claimed is:

1. A remote notification method, comprising:
   through the Internet, receiving user information sent by an application program executed in a first communication device;
   setting a remote notification mode according to the user information;
   receiving a startup command sent by a terminal device;
   receiving a message sent by the application program through the Internet; and
   sending out the message according to the remote notification mode.

2. The remote notification method according to claim 1, wherein the message is a first call request or a short message received by the first communication device.

3. The remote notification method according to claim 2, wherein the message is sent to a second communication device through an email or a second call request under the remote notification mode.

4. The remote notification method according to claim 3, wherein, when the message is the first call request, the second call request is sent to the second communication device under the remote notification mode.

5. The remote notification method according to claim 4, further comprising:
   when the second call request is answered, sending an answered command to the application program through the Internet to enable the first communication device to respond a first audio signal to the first call request through the Internet;
   sending the first audio signal to the second communication device;
   receiving a second audio signal sent by the second communication device; and
   sending the second audio signal to the application program through the Internet.

6. The remote notification method according to claim 3, wherein when the message is the short message, a content of the short message is sent through the email under the remote notification mode.

7. The remote notification method according to claim 3, wherein, when the message is the first call request, a caller number corresponding to the first call request is sent through the email under the remote notification mode.

8. The remote notification method according to claim 1, further comprising:
   determining whether to successfully access the application program through the Internet; and
   if the application program is not successfully accessed through the Internet, sending a connection command to the application program through a telecommunication network, for controlling the first communication device via the application program to communicate with the Internet.

9. The remote notification method according to claim 1, further comprising:
   receiving an operation command sent by the terminal device; and
   sending the operation command to the application program through the Internet, for controlling the first communication device via the application program to execute the operation command.

10. The remote notification method according to claim 1, wherein the user information is an email address, a phone number of the first communication device, an identification code of the application program or an international mobile equipment identity number (IMEI) of the first communication device.

* * * * *